United States Patent [19]
Thebault et al.

[11] Patent Number: 5,822,384
[45] Date of Patent: Oct. 13, 1998

[54] SEARCH METHOD FOR ACQUISITION OF TIME SYNCHRONIZATION BETWEEN A SPREADING SEQUENCE OF A RECEIVER AND THAT OF A TRANSMITTER

[75] Inventors: Bertrand Thebault, Montauban de Bretagne; Philippe Sehier, Lavallois Perret, both of France

[73] Assignee: Alcatel Telspace, Nanterre Cedex, France

[21] Appl. No.: 491,576

[22] Filed: Jun. 16, 1995

[30] Foreign Application Priority Data

Jun. 30, 1994 [FR] France ................................. 94 08069

[51] Int. Cl.$^6$ ..................................................... H04J 3/06
[52] U.S. Cl. ........................ 375/367; 375/200; 370/515; 370/503
[58] Field of Search .................................. 370/320, 335, 370/342, 350, 441, 509, 503, 515, 514; 375/200, 202, 206, 208, 354, 359, 367

[56] References Cited

U.S. PATENT DOCUMENTS

| | | | |
|---|---|---|---|
| 4,435,821 | 3/1984 | Ito et al. | 375/1 |
| 4,442,527 | 4/1984 | Munday | 375/1 |
| 4,538,281 | 8/1985 | Rajan | 375/2.2 |
| 4,558,453 | 12/1985 | Mimken | 375/1 |
| 4,653,069 | 3/1987 | Roeder | 380/31 |
| 5,111,478 | 5/1992 | McDonald | 375/1 |
| 5,128,957 | 7/1992 | Nakagawa | 375/1 |

OTHER PUBLICATIONS

*IEEE Transactions on Communications*, vol. COM–31, No. 5, May 1983, New York US, pp. 650–659, Dicarlo et al, Multiple Dwell Serial Search: Performance and Application to Direct Sequence Code Acquisition.

*Primary Examiner*—Wellington Chin
*Assistant Examiner*—Jean B. Corrielus
*Attorney, Agent, or Firm*—Sughrue, Mion, Zinn, Macpeak & Seas, PLLC

[57] ABSTRACT

A search method for acquisition of time synchronization between a spreading sequence of a receiver and a spreading sequence of a transmitter, the receiver receiving a spread signal and demodulating the signal using the spreading sequence of the receiver includes a test step consisting in measuring the energy of the demodulated signal by integrating the demodulated signal during a time interval $Tobs_i$ and comparing that energy with a threshold value to determine if the threshold value is exceeded, for a given hypothesis as to the time shift between the spreading sequences, and modifying the time shift hypothesis if the threshold value is not exceeded and incrementing the value of a counter. Steps a and b are repeated until the value of the counter reaches a predetermined value. When the predetermined value is reached, the time interval $Tobs_i$ is replaced with a time interval $Tobs_{i+1}$, with $Tobs_{i+1}=m.Tobs_i$ and $m>1$, and the process resumes at step a replacing $Tobs_i$ with $Tobs_{i+1}$. The process ends when the predetermined value has been reached a predetermined number of times. The invention applies to the reception of spread signals with an unknown signal-to-noise ratio.

5 Claims, 3 Drawing Sheets

SEARCH METHOD FOR ACQUISITION OF TIME SYNCHRONIZATION BETWEEN A SPREADING SEQUENCE OF A RECEIVER AND THAT OF A TRANSMITTER

BACKGROUND OF THE INVENTION

1. Field of the Invention

The present invention concerns a search method for acquisition of time synchronization between a spreading sequence of a receiver and that of a transmitter. It has particular application in spread spectrum telecommunication systems using frequency hopping or pseudo-random encoding of a source signal transmitted to a receiver.

2. Description of the Prior Art

The spectrum spreading operation entails either multiplying the wanted signal to be transmitted from a transmitter to a receiver by a code, called the spreading sequence or direct sequence, produced by a pseudo-random generator or practising frequency hopping, i.e. modifying the carrier frequency of the transmitted signal in a pseudo-random manner. Frequency hopping can be applied to a signal already spread by means of a spreading sequence.

The receiver of a spread spectrum signal must be able to synchronize its spreading sequence generator with that of the transmitter so that the wanted signal can be extracted from the received signal. This spreading sequence synchronization search function is implemented during the time synchronization acquisition phases, for example when setting up a call. When synchronization has been achieved, the correlation of the spreading sequences of the transmitter and the receiver is theoretically equal to 1.

FIG. 1 is a block diagram of a prior art receiver receiving a signal spread by frequency hopping.

A signal SE spread by frequency hopping is applied to the input of a broadband mixer 10 also receiving a signal from a frequency synthesizer 11. The output signal of the mixer 10 is applied to an intermediate frequency filter 12 supplying a signal x(t) to a non-coherent demodulator stage 13. In this instance the signal x(t) is a multiple phase signal, for example a QPSK signal. The stage 13 includes two mixers 14, 15 receiving the signal x(t) and two signals in phase quadrature (90° phase-shifter 16) at the intermediate frequency of the filter 12. The output signals of the mixers 14, 15 are applied to low-pass filters 17, 18 followed by modules 19, 20 which square the signals applied to them. The output signals of the modules 19, 20 are added by an adder 21 the output signal of which constitutes a demodulated signal S which is indicative of the power of the demodulated received signal and which is applied to a synchronization acquisition detector stage 22. The stage 22 includes means 23 for integrating the demodulated signal S supplying a magnitude indicative of the energy content of the demodulated received signal followed by means 24 for comparing this energy with a threshold value λ. If the energy measured by the means 23 is greater than the threshold value λ, a signal FIN indicates that synchronization has been acquired. If this energy is less than λ, on the other hand, the comparator means generate a control signal R for time shifting a signal from a clock 25. The clock 25 controls a spreading sequence generator 26 that supplies to the frequency synthesizer 11 a control signal indicating the required frequency of the signal applied to the mixer 10.

FIG. 2 is a block diagram of a prior art receiver receiving a signal spread by pseudo-random encoding of a source signal transmitted to the receiver.

A signal SEP spread by pseudo-random encoding of the source signal transmitted to the receiver in this instance comprises a carrier modulated by two signals in phase quadrature. The signal SEP is applied to the input of two broadband mixers 27, 28 also receiving demodulation signals I(t), Q(t) constituting a baseband conversion frequency. The output signals of the mixers 27, 28 are applied to a non-coherent demodulator stage 29 having at its input two mixers 30 and 31 receiving a spreading sequence from a spreading, sequence generator 32. The output signals of the mixers 30 and 31 are applied to low-pass filters 32 and 33 each followed by a module 34, 35 for squaring the signal applied to it. The output signals of the modules 34 and 35 are added by an adder 36 the output signal of which constitutes a demodulated signal S which is indicative of the power of the demodulated received signal and which is applied to a synchronization acquisition detector stage 37. The stage 37 includes means 38 for integrating the demodulated signal supplying a magnitude indicative of the energy content of the demodulated received signal followed, after sampling, by means 39 for comparing this energy with a threshold value λ. If the energy measured by the means 39 is greater than the threshold value λ a signal FIN indicates that synchronization has been acquired. If this energy is less than λ, on the other hand, the comparator means generate a control signal R for time shifting the sequence from the generator 32.

In the receivers of FIGS. 1 and 2 the energy content of the demodulated received signal applied to the inputs of the filters 17, 18 and 32, 33 is measured. Because of the noise that is present on any microwave link, it is necessary to define a correlation threshold λ beyond which synchronization is deemed to have been achieved. This threshold depends on the signal-to-noise (S/N) ratio of the transmission link and on the integration time. As it is not possible to determine the S/N ratio without first synchronizing the spreading sequences (as otherwise the wanted signal cannot be extracted from the received signal), the correlation threshold λ is based on a previous estimate of the link balance. This establishes a minimal correlation threshold corresponding to a minimal S/N ratio of the link and to a minimal integration time. This integration time must be as short as possible, to allow fast synchronization acquisition, but a long integration period has the advantage of reducing the risk of noise causing false detection of synchronization (false locking).

A synchronization acquisition detector system is described on page 44 in volume 3 of "Spread Spectrum Communications" by M. K. SIMON, J. K. OMURA, R. A. SCHOLTZ and B. K. LEVITT, published by Computer Science Press under the heading "The multiple dwell serial PN acquisition system". This system is described with reference to FIG. 3.

This figure shows a synchronization acquisition detector system processing a signal the spectrum of which has been spread by pseudo-random encoding of a source signal. The received signal SEP is applied to a mixer 40 also receiving a local spreading sequence from a spreading sequence generator 41. The output signal of the mixer 40 is applied to a band-pass filter 42 followed by an envelope detector 43 which squares the signal applied to it. The output signal of the detector 43 is applied to a plurality of integrators 44a through 44c each supplying an energy Ea, Eb, Ec. Their integration times are increasing, meaning that the integration time in integrator 44c is greater than that in integrator 44b which is in turn greater than that in integrator 44a. The energies detected are applied successively to comparators 45a, 45b, 45c receiving threshold values $\lambda 1$, $\lambda 2$, $\lambda 3$. If the energy Ea supplied by the integrator 44a is greater than the threshold value $\lambda 1$, synchronization acquisition detection is confirmed by applying to the input of the comparator 45b the energy Eb detected by the integrator 44b. On the other hand, if the energy Ea is less than or equal to the threshold value $\lambda 1$, a control signal R is generated to time shift the sequence from the generator 41. The comparators 45b and 45c operate in the same manner, except that if the comparator 45c indicates that the energy Ec is greater than the threshold $\lambda 3$, the system generates an output signal FIN indicating that synchronization has been acquired.

Thus the principle applied here is that synchronization is deemed to have been acquired only if a plurality of successive passes, in which the energy of the demodulated signal is integrated for increasing times and the result is compared to threshold values, indicate that synchronization has been acquired. The integration times and the threshold values depend on the expected S/N ratio, as determined from the link balance. By implication, if a given number of failures is reached, the measurements are terminated and an indication is given that synchronization has not been acquired.

The major drawback of these synchronization detection principles is that if the effective S/N ratio of the link is greater than that determined by the link balance, because of changes in atmospheric conditions, for example, the acquisition time is not shortened commensurately; the only result is that reliability is improved. Consequently, no advantage is obtained by an S/N ratio greater than that determined by the link balance.

Also, in a transmission environment subject to scrambling, synchronization can take a very long time to acquire as multiple integrations will be required for each time shift hypothesis, even if the tests that follow on from the integration indicate that the corresponding threshold values have not been achieved.

An object of the present invention is to remedy these drawbacks.

To be more precise, one object of the invention is to provide a fast search method for time synchronization of a spread spectrum transmission system using a spreading sequence or frequency hopping such that a search can be carried out despite a high degree of uncertainty as to the S/N ratio.

A complementary object of the invention is to provide a method of this kind in which the synchronization acquisition time is shortened if the S/N ratio improves, i.e. the acquisition time is a decreasing function of the S/N ratio.

SUMMARY OF THE INVENTION

These objects, and others that will emerge below, are achieved by a search method for acquisition of time synchronization between a spreading sequence of a receiver and a spreading sequence of a transmitter, said receiver receiving a spread signal and demodulating said signal using said spreading sequence of said receiver, said method including a test step consisting in:

a—measuring the energy of the demodulated signal by integrating the demodulated signal during a time interval $Tobs_i$ and comparing that energy with a threshold value to determine if the threshold value is exceeded, for a given hypothesis as to the time shift between the spreading sequences, and b—modifying the time shift hypothesis if the threshold value is not exceeded and incrementing the value of a counter;

said method repeating steps a and b until the value of said counter reaches a predetermined value and, when said predetermined value is reached, replacing said time interval $Tobs_i$ with a time interval $Tobs_{i+1}$, with $Tobs_{i+1}=m.Tobs_i$ and $m>1$, and resuming said method at step a replacing $Tobs_i$ with $Tobs_{i+1}$, said method ending when said predetermined value has been reached a predetermined number of times.

Accordingly, the invention proposes to execute a plurality of steps each comprising at least one pass (integration followed by comparison with a threshold value), the integration time increasing from one step to the next. It is thus possible to begin with a very short integration time (corresponding to an assumed high S/N ratio) that is tested against different time shift hypotheses in the first step. If none of these hypotheses is the correct one, the search resumes with a longer integration time, and this process continues until synchronization is achieved.

The main advantage of this method is that synchronization is achieved faster than in the prior art if the S/N ratio is better than that defined beforehand by the link balance.

In an advantageous embodiment of the invention step a comprises a plurality of successive passes each entailing measuring the energy of the demodulated signal by integrating it during a time interval and comparing said energy with a threshold value to determine if said threshold value is exceeded, said integration time increasing from one pass to the next, a pass being executed if the previous pass indicates that the energy measured during that pass is greater than the corresponding threshold value.

The integration times are preferably non-contiguous. The duration of two successive passes is then increased but reliability is also increased because the energy measurements are not correlated.

The method of the invention can be applied indifferently to a spread spectrum receiver using frequency hopping or a spread spectrum receiver using pseudo-random encoding of a source signal transmitted to the receiver.

Other features and advantages of the invention will emerge from a reading of the following description of a preferred embodiment of the invention and from the appended drawings.

DETAILED DESCRIPTION OF THE PREFERRED EMBODIMENT

Figure 1:
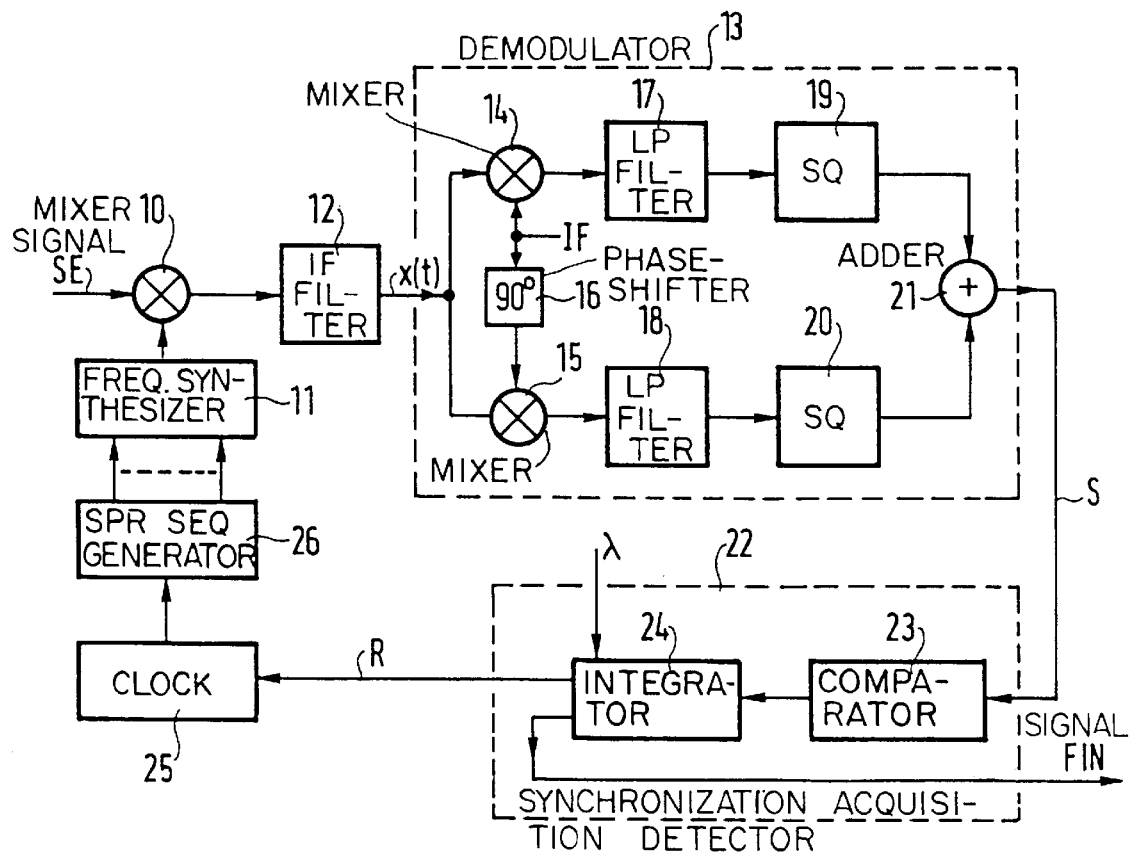
FIG. 1 is a block diagram of a prior art receiver receiving a signal spread by frequency hopping.
Figure 2:
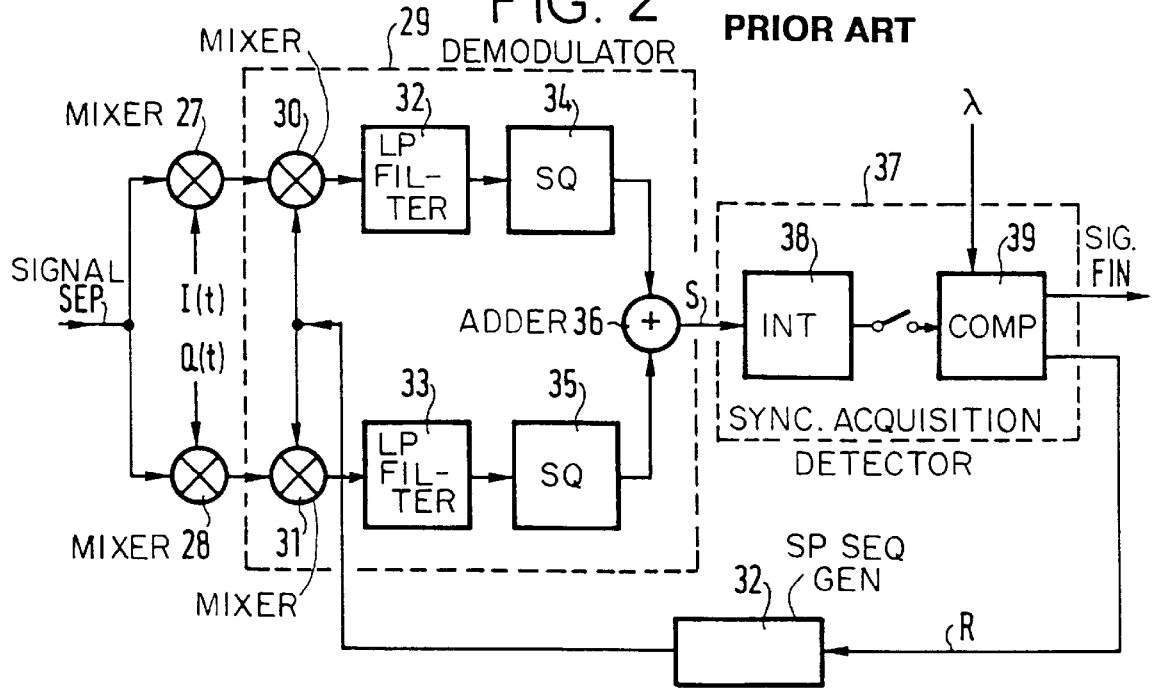
FIG. 2 is a block diagram of a prior art receiver receiving a signal spread by pseudo-random encoding.
Figure 3:
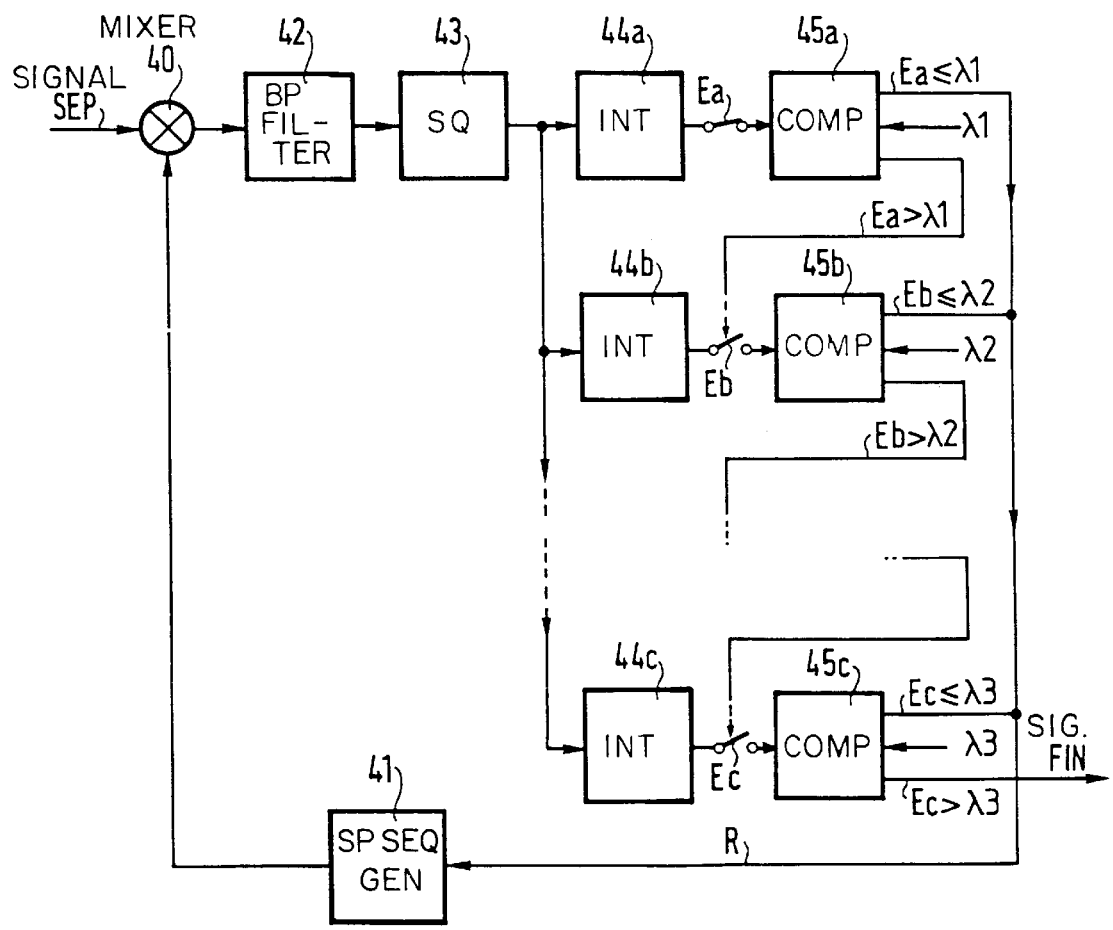
FIG. 3 shows a multipass synchronization acquisition detection system processing a signal the spectrum of which has been spread by pseudo-random encoding of a source signal.

FIGS. 1 through 3 have been described previously in connection with the prior art.

Figure 4:
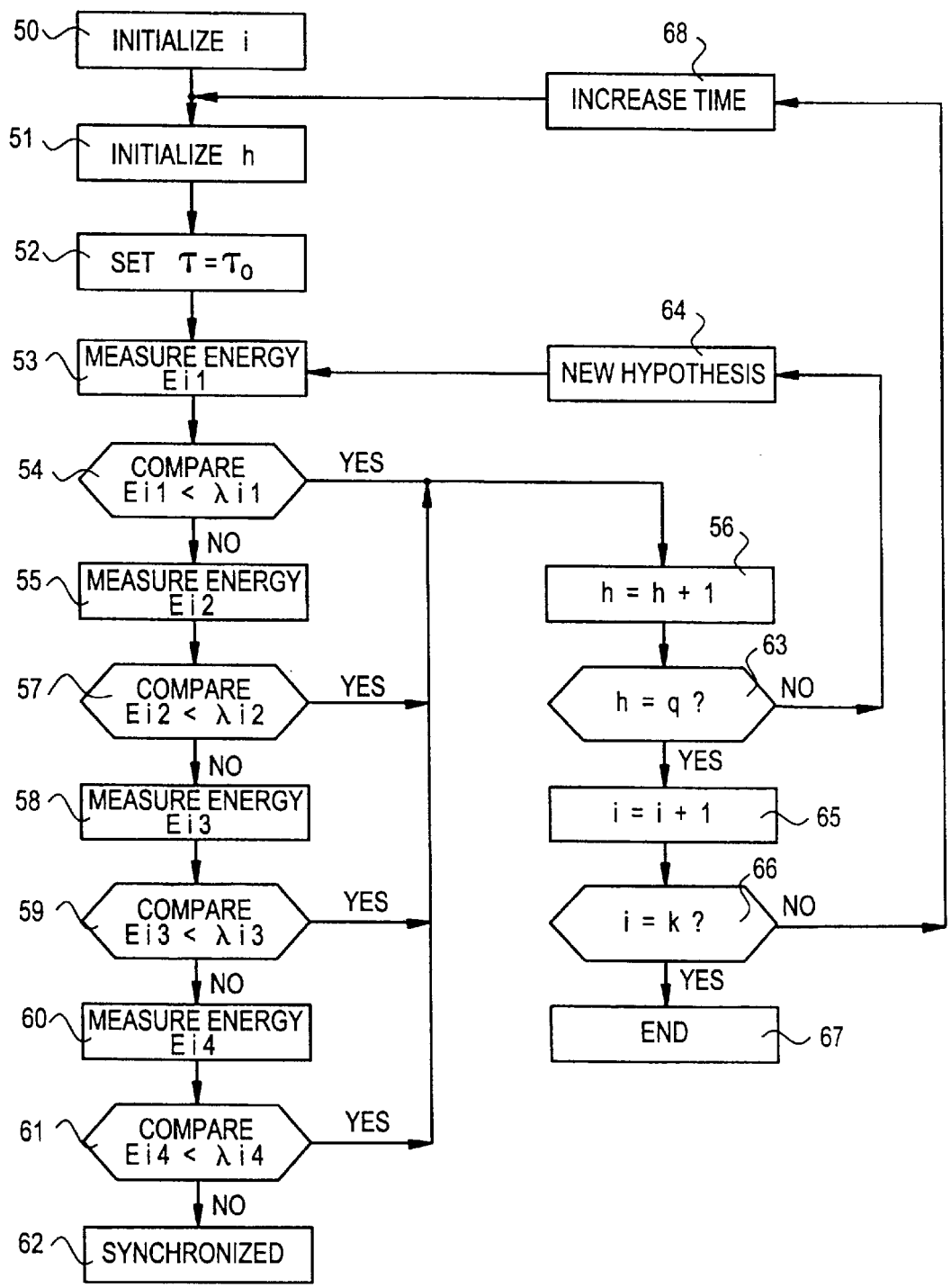
FIG. 4 is a flowchart representing one preferred embodiment of the method of the invention.

FIG. 4 is a flowchart representing one preferred embodiment of the method of the invention.

The invention is based on the hypothesis that the spread spectrum signal received has an S/N ratio greater than a particular threshold. This hypothesis is somewhat optimistic.

In step 50, a variable i is initialized to the value 0. The variable i represents a processing step for a plurality of hypotheses as to the time shifts of the spreading sequence of the receiver relative to that of the transmitter and is in a range [0, k]. In step 51 a variable h is initialized to the value 0. The variable h represents the number of time shift hypotheses to be used for each value of i and h is in a range [0, q]. In step 52 a time origin is set by making $\tau=\tau_0$. The value of $\tau$ is in a range $[\tau_0, \tau_h]$. In step 53 the energy of the demodulated signal S is measured for an observation time $Tobs_{i1}$ which is an integer multiple of the period of the spreading sequence. The energy $E_{i1}$ defined by the following equation is calculated:

$$E_{i1} = \int_0^{Tobs_{i1}} S\, dt$$

where S is the signal applied to the input of the synchronization acquisition detector stage.

In step 54 the energy $E_1$ is compared with a threshold value $\lambda_{i1}$ as a basic test. If $E_{i1}$ is less than $\lambda_{i1}$, the sequences cannot be synchronized and the flowchart branches to step 56. On the other hand, if $E_{i1}$ is greater than $\lambda_{i1}$ the sequences may be synchronized, unless the value higher than the threshold value is due to noise, and the flowchart proceeds to step 55 in which the energy of the demodulated signal is measured during an observation time $Tobs_{i2} > Tobs_{i1}$ with, for example, $Tobs_{i2} = n.Tobs_{i1}$ and $n>1$ (not necessarily an integer). The energy $E_{i2}$ defined by the following equation is then calculated:

$$E_{i2} = \int_{Tobs_{i1}}^{Tobs_{i1} + Tobs_{i2}} S\, dt$$

In theory the energy $E_{i2}$ is greater than the energy $E_{i1}$ since the integration time is longer. Note that the integration time intervals are preferably non-contiguous in order to avoid falsification of the measurement by including energy measured during $Tobs_{i1}$ that may be due to noise. This makes synchronization detection more reliable than in the prior art. For simplicity of implementation the time intervals are preferably contiguous.

In step 57, the energy $E_{i2}$ is compared with a threshold value $\lambda_{i2}$ as a second basic test. The threshold value $\lambda_{i2}$ is greater than the threshold value $\lambda_{i1}$, which corresponds to a request for confirmation of steps 53 and 54. If the energy $E_{i2}$ is less than $\lambda_{i2}$, the sequences cannot be synchronized and the flowchart branches to step 56. On the other hand, if the energy $E_{i2}$ is greater than $\lambda_{i2}$, the probability that the sequences are synchronized increases. This completes a first pass corresponding to steps 53 and 54 followed by another pass corresponding to steps 55, 57.

Another pass can then be executed to confirm the previous passes, measuring the energy of the signal S over a longer duration. In the FIG. 4 flowchart two successive passes are executed:

in step 58, the energy $E_{i3}$ defined by the following equation is measured:

$$E_{i3} = \int_{Tobs_{i1} + Tobs_{i2}}^{Tobs_{i1} + Tobs_{i2} + Tobs_{i3}} S\, dt$$

with $Tobs_{i3} > Tobs_{i2}$ and, for example, $Tobs_{i3} = n.Tobs_{i2}$ and, in step 59, the energy $E_{i3}$ is compared with a threshold value $\lambda_{i3}$;

in step 60, the energy $E_{i4}$ defined by the following equation is measured:

$$E_{i4} = \int_{Tobs_{i1} + Tobs_{i2} + Tobs_{i3}}^{Tobs_{i1} + Tobs_{i2} + Tobs_{i3} + Tobs_{i4}} S\, dt$$

with $Tobs_{i4} > Tobs_{i3}$ and, for example, $Tobs_{i4} = n.Tobs_{i3}$ and, in step 61, the energy $E_{i4}$ is compared with a threshold value $\lambda_{i4}$.

Successive synchronization tests are carried out in this way in non-contiguous time intervals of increasing duration. If any test fails, the flowchart branches to step 56. If the last test result is positive, in step 62 synchronization of the sequences is declared to have been obtained for the time shift hypothesis $\tau$ in question.

In step 56 h is incremented (h=h+1) and, in step 63, a test is carried out to find out if h is equal to g. If not, the flowchart branches to step 64 and a new time shift hypothesis $\tau_h$ is adopted. The spreading sequence of the receiver is then time shifted and the procedure resumes at step 53. The value of g is high, for example 1000.

The invention as explained until now corresponds to the mode of operation of the device from FIG. 3 except that the integration time intervals are non-contiguous.

A test step may be defined as the following actions:

a—measuring the energy of the demodulated signal by integrating the demodulated signal during a time interval $Tobs_i$ and comparing that energy with a threshold value to determine if the threshold value is exceeded, for a given hypothesis as to the time shift between the spreading sequences, and b—modifying the time shift hypothesis if the threshold value is not exceeded and incrementing the value of a counter, and repeating steps a and b until the counter value reaches a predetermined value.

The invention then proposes, if the response to the step 63 test is positive, to proceed to step 65 in which i is incremented (i=i+1). In step 66, a test is carried out to determine if i is equal to k. The value of k is equal to 4, for example. If i is not equal to k the flowchart branches to step 68 in which the observation time $Tobs_i$ is increased by a factor m greater than 1. This amounts to the operation:

$Tobs_{i+1} = m.Tobs_i$

The value of m is not necessarily an integer. In a preferred embodiment of the invention m has the value 2. The procedure then resumes at step 51 and all the integration times previously defined are increased by a factor m.

If the response to test 66 is positive, step 67 is the end of the synchronization search process. After step 67 the process can be resumed from the beginning using a new value of $\tau$.

Thus the method of the invention adds k−1 subsequent further steps to the single processing step of the prior art technique. Each processing step includes one or more passes executed in parallel or one after the other, the integration time increasing from one step to the next.

The invention is therefore based on the principle of assuming a high S/N ratio, for example in the order of 10 dB, for the first processing step. If the value g is reached, i.e. if all the passes of the first step indicate that the spreading sequences are not synchronized, a second processing step is started with one or more integration times of longer duration.

Of course, the method of the invention applies equally well to the case in which the integration times overlap, as explained with reference to FIG. 3. The invention applies when a processing step includes a plurality of passes and when a processing step includes only one pass (53, 54).

In the case where the processing steps each include a plurality of passes, the integration time is increased from one pass to the next by a factor of 4 (n=4), for example.

To optimize the overall duration of two successive passes, it is preferable to take $Tobs_{i+1}=2.Tobs_i$ and to determine the threshold $\lambda_{i1}$ for the first pass so that for the smallest feasible signal-to-noise ratio on this pass $pfa_{i1}=1/16$.

The probability of false locking (false alarm) on the next pass ($pfa_{i2}$) can be in the order of $10^{-5}$, and thus much lower, for q=1000.

The invention is particularly suitable for transmission systems with a low S/N ratio. It applies to receivers including coherent or non-coherent demodulation stages. It can reduce the mean synchronization acquisition time by a large factor if the S/N ratio is greater than that assumed. The main advantage is that the synchronization search is carried out faster than in the prior art because non-pertinent time shift hypotheses can be analyzed during short time intervals.

The value of the integration time of the first pass and the values of the coefficients m and n are determined on the basis of the false alarm and detection probability and the minimum S/N ratio. The invention applies in particular when the power of the wanted signal received is not known.

There is claimed:

1. In a system including a transmitter transmitting a spread signal using a transmitter spreading sequence and a receiver receiving said spread signal and demodulating said spread signal using a receiver spreading sequence, a method of acquiring time synchronization between said receiver spreading sequence and said transmitter spreading sequence, said method comprising the steps of:

a) measuring the energy of the demodulated signal at said receiver by integrating the demodulated signal during a time interval $Tobs_i$ and comparing that energy with a threshold value to determine if the threshold value is exceeded, for a given hypothesis as to the time shift between the spreading sequences, wherein said threshold not being exceeded is an indication that synchronization has not been acquired and said threshold being exceeded is an indication that synchronization may have been acquired;

b) modifying the time shift hypothesis if the threshold value is not exceeded and incrementing the value of a counter; and c) repeating said measuring and modifying steps a and b until the value of said counter reaches a predetermined value;

d) when said predetermined value is reached, replacing said time interval $Tobs_i$ with a time interval $Tobs_{i+1}$, with $Tobs_{i+1}=m.Tobs_i$ and m>1, and e) performing said steps a)–d) using the time interval $Tobs_{i+1}$; and f) repeating steps a)–e) until said predetermined value has been reached a predetermined number of times.

2. Method according to claim 1 wherein step a comprises a plurality of successive passes each entailing measuring the energy of the demodulated signal by integrating it during a time interval and comparing said energy with a threshold value to determine if said threshold value is exceeded, said integration time increasing from one pass to the next, a pass being executed if the previous pass indicates that the energy measured during that pass is greater than the corresponding threshold value.

3. Method according to claim 2 wherein said integration times are non-contiguous.

4. Method according to claim 1 applied to a receiver in which the spectrum is spread by frequency hopping.

5. Method according to claim 1 applied to a receiver in which the spectrum is spread by pseudo-random encoding of a source signal transmitted to the receiver.

* * * * *